United States Patent [19]

Pilger et al.

[11] Patent Number: 4,919,878

[45] Date of Patent: Apr. 24, 1990

[54] PROCESS FOR THE PRODUCTION OF POLYURETHANE-AND/OR POLYUREA-BASED MOLDINGS

[75] Inventors: Friedhelm Pilger; Richard Kopp, both of Cologne; Otto Ganster, Odenthal, all of Fed. Rep. of Germany

[73] Assignee: Bayer Aktiengesellschaft, Leverkusen Bayerwerk, Fed. Rep. of Germany

[21] Appl. No.: 81,043

[22] Filed: Aug. 3, 1987

[30] Foreign Application Priority Data

Aug. 9, 1986 [DE] Fed. Rep. of Germany ....... 3627078

[51] Int. Cl.$^5$ .............................................. B29C 45/00
[52] U.S. Cl. .................................. 264/300; 264/455; 264/53; 264/54; 264/328.6; 264/337; 264/DIG. 83; 264/331.19; 521/115; 521/118; 521/124; 521/129; 521/164; 524/714; 524/724; 524/773; 528/53; 528/55
[58] Field of Search ............... 264/53, 54, 45.5, 328.6, 264/337, 300, DIG. 83, 331.19; 521/115, 118, 124, 129, 164, 714, 724, 773; 528/53, 55

[56] References Cited

U.S. PATENT DOCUMENTS

| | | | |
|---|---|---|---|
| 4,581,387 | 4/1986 | Werner et al. | 521/128 |
| 4,585,803 | 4/1986 | Nelson et al. | 521/118 X |
| 4,617,286 | 10/1986 | Arai et al. | 528/53 X |
| 4,645,630 | 2/1987 | Rasshofer et al. | 521/51 X |
| 4,710,521 | 12/1987 | Soukup et al. | 521/129 X |
| 4,774,263 | 9/1988 | Weber et al. | 521/51 |
| 4,774,264 | 9/1988 | Weber et al. | 521/51 |

FOREIGN PATENT DOCUMENTS

WO84/03288 8/1984 PCT Int'l Appl. .

*Primary Examiner*—Hubert C. Lorin
*Attorney, Agent, or Firm*—Joseph C. Gil; Thomas W. Roy

[57] ABSTRACT

A process for the production of optionally foamed moldings having a compact surface by the reaction in closed molds of a mixture of (a) organic polyisocyanates,
(b) compounds containing isocyanate-reactive groups and having a molecular weight of 62 to about 10,000 and
(c) mold release agents based on salts of (i) saturated or unsaturated aliphatic or cycloaliphatic carboxylic acids or carboxylic acid mixtures containing (on a statistical average) at least 8 carbon atoms per molecule and (ii) tertiary amines, characterized in that the release agents (c) used are salts in which the amine component (ii) is based on tertiary monoamines or mixtures of tertiary monoamines corresponding to the following formula

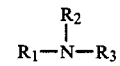

in which $R_1$ represents a saturated or unsaturated aliphatic hydrocarbon radical containing at least 12 carbon atoms and $R_2$ and $R_3$ may be the same or different and represent saturated or unsaturated, preferably saturated, aliphatic hydrocarbon radicals containing from 1 to 18, preferably from 1 to 4 carbon atoms, more preferably, methyl groups and/or $C_2$-$C_{40}$ hydroxyalkyl radicals optionally containing ether bridges.

6 Claims, No Drawings

PROCESS FOR THE PRODUCTION OF POLYURETHANE-AND/OR POLYUREA-BASED MOLDINGS

BACKGROUND OF THE INVENTION

1. Field of the Invention

This invention relates to a new process for the production of optionally foamed moldings based on polyurethanes and/or polyureas having a compact surface and outstanding mold-release properties by the reaction in closed molds of an optionally foamable reaction mixture of polyisocyanates, compounds containing isocyanate-reactive hydrogen atoms and internal mold release agents based on certain salts of organic carboxylic acids and tertiary amines.

2. Description of the Prior Art

The molds used in the production of polyurethane- and/or polyurea-based moldings are preferably made of metal. In order during mold release to prevent the molding from adhering to the surface of the mold, the mold is frequently coated with an external release agent. However, it is also known that the effect of external release agents can be improved or their use rendered largely superfluous by also using so-called internal release agents.

Thus, it is disclosed in DE-OS No. 1,953,637 that the need to apply an external mold release agent may be eliminated by adding to the foamable reaction mixture certain additives which impart excellent release properties to the finished molding in metal molds. Salts of aliphatic carboxylic acids containing at least 25 carbon atoms with preferably primary amines or amines containing amide or ester groups are recommended for use as these additives.

DE-OS No. 2,121,670 recommends the use of binary or ternary mixtures of different internal mold release agents, salts of aliphatic carboxylic acids containing at least 20 carbon atoms with amines optionally containing amide and/or ester groups being suitable for use as one of the components of these mixtures.

DE-OS No. 2,431,968 recommends certain salts of saturated or unsaturated aliphatic or cycloaliphatic carboxylic acids containing at least 8 carbon atoms and tertiary amines which do not contain any amide or ester groups and in which the atomic ratio of tertiary amine nitrogen to carbon in the amine molecule is 1:3 to 1:12 for use as internal mold release agents.

In the continuing search for internal release agents which provide a good release effect, it has now been found that salts of saturated or unsaturated aliphatic or cycloaliphatic carboxylic acids containing at least 8 carbon atoms and tertiary amines substituted by a hydrocarbon radical containing at least 12 carbon atoms are particularly effective internal mold release agents. The release agents suitable for use in accordance with the invention which are described in detail hereinafter are distinguished from the release agents preferably used in accordance with DE-OS No. 2,431,968 in particular by the fact that the catalytic effect of the tertiary amines present in protonized form in the salts is of subsidiary importance so that the use of the release agents according to the invention does not have any significant effect on the reactivity of the reaction mixtures.

SUMMARY OF THE INVENTION

The present invention is directed to a process for the production of optionally foamed moldings having a compact surface by the reaction in closed molds of a mixture of (a) organic polyisocyanates,
(b) compounds containing isocyanate-reactive groups and having a molecular weight of 62 to about 10,000 and
(c) mold release agents based on salts of (i) saturated or unsaturated aliphatic or cycloaliphatic carboxylic acids or carboxylic acid mixtures containing (on a statistical average) at least 8 carbon atoms per molecule and (ii) tertiary amines, characterized in that the release agents (c) used are salts in which the amine component (ii) is based on tertiary monoamines or mixtures of tertiary monoamines corresponding to the following formula

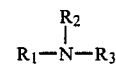

in which $R_1$ represents a saturated or unsaturated aliphatic hydrocarbon radical containing at least 12 carbon atoms and $R_2$ and $R_3$ may be the same or different and represent saturated or unsaturated, preferably saturated, aliphatic hydrocarbon radicals containing from 1 to 18, preferably from 1 to 4 carbon atoms, more preferably methyl groups and/or $C_2$–$C_{40}$ hydroxyalkyl radicals optionally containing ether bridges.

The present invention is also directed to the moldings produced by this process.

DETAILED DESCRIPTION OF THE INVENTION

Suitable starting components (a) for the process according to the invention are any organic polyisocyanates, for example of the type described by W. Siefken in Justus Liebigs Annalen der Chemie (1949), 562, pages 75 to 136. Suitable polyisocyanates include the polyisocyanates mentioned by way of example in U.S. Pat. No. 4,065,410 (herein incorporated by reference in its entirety) at column 2, line 34 to column 3, line 22.

Component (a) is preferably one of the commercially available polyisocyanates of polyurethane chemistry, i.e. 2,4- and/or 2,6-diisocyanatotoluene (TDI), 4,4'- and/or 2,4'-diisocyanatodiphenylmethane, polyphenylpolymethylene polyisocyanates of the type obtained by phosgenation of aniline-formaldehyde condensates (crude MDI) or carbodiimide-, urethane-, allophanate-, isocyanurate-, urea- or biuret-modified derivatives of these polyisocyanates.

The particularly preferred polyisocyanates (a) include (i) polyisocyanates containing urethane groups of the type obtained, for example, by reacting excess quantities of 4,4'-diisocyanatodiphenylmethane or technical mixtures thereof with 2,4'-diisocyanatodiphenylmethane with low molecular weight, linear or branched alkanediols, dialkylene glycols or polyoxyalkylene glycols having a molecular weight of up to 3000, especially polypropylene glycols having a maximum molecular weight of about 700, (ii) 2,4- and/or 2,6-diisocyanatotoluene, (iii) carbodiimide, uretone imine and/or isocyanurate polyisocyanates based on mixtures of 2,4'- and 4,4'-diisocyanatodiphenylmethane, 2,4- and/or 2,6-diisocyanatotoluene and more especially 4,4'-diisocyanatodiphenylmethane, (iv) mixtures of 2,4-and 2,6-diisocyanatotoluene with 4,4'- and, optionally, 2,4'- diisocyanatodiphenylmethane or (v) mixtures of the above-mentioned diisocyanatotoluenes with crude MDI.

Starting component (b) is a compound containing isocyanate-reactive groups and having a molecular weight of 62 to about 10,000. Suitable compounds include compounds or mixtures of compounds containing at least 2 and generally (on a statistical average) from 2 to 3 isocyanate-reactive groups. The isocyanate-reactive groups are alcoholic, primary or secondary hydroxyl groups, primary or secondary amino groups, carboxyl groups or thiol groups, preferably primary or secondary hydroxyl groups and/or primary or secondary amino groups; the terms "primary" and "secondary" in the first case relating to the nature of the carbon atom attached to the hydroxyl group and, in the second case, to the amino group itself. In general, component (b) is a mixture of (b1) relatively high molecular compounds, i.e. compounds having a molecular weight of 400 to about 10,000, preferably about 1000 to 6000, containing at least 2 and preferably from 2 to 4 hydroxyl and/or amino groups of the above-mentioned type with (b2) low molecular weight compounds, i.e. compounds having a molecular weight of 60 to 399, containing at least 2 and preferably from 2 to 4 hydroxyl and/or amino groups of the type mentioned.

Suitable relatively high molecular weight compounds (b1) include in particular the polyester polyols or polyether polyols known per se from polyurethane chemistry or the amino polyethers known from polyisocyanate chemistry.

The polyhydroxy polyethers suitable for use in accordance with the invention are known and are obtained, for example, by polymerizing epoxides such as ethylene oxide, propylene oxide, butylene oxide, tetrahydrofuran, styrene oxide or epichlorohydrin, on their own, for example in the presence of $BF_3$, or by the addition of these epoxides, optionally in admixture or successively, onto starter components containing reactive hydrogen atoms such as alcohols or amines, for example, water, ethylene glycol, 1,3- or 1,2-propylene glycol, trimethylol propane, 4,4'-dihydroxydiphenyl propane, aniline, ammonia, ethanolamine and ethylenediamine.

Sucrose polyethers of the type described, for example, in DE-AS Nos. 1,176,358 and 1,064,938 are also suitable for use in accordance with the invention. In many cases, it is preferred to use polyethers predominantly containing primary OH groups (up to 90% by weight, based on all of the OH groups present in the polyether). Polyethers modified by vinyl polymers of the type obtained for example by polymerizing styrene and/or acrylonitrile in the presence of polyethers (U.S. Pat. Nos. 3,383,351, 3,304,273, 3,523,093, 3,110,695, DE-PS No. 1,152,536), may also be used.

The polyester polyols suitable for use as component b1) are the known reaction products of polyhydric, preferably dihydric and, optionally, trihydric alcohols with polybasic, preferably dibasic, carboxylic acids. Instead of using the free polycarboxylic acids, it is also possible to use the corresponding polycarboxylic acid anhydrides or corresponding polycarboxylic acid esters of lower alcohols or mixtures thereof for producing the polyesters. The polycarboxylic acids may be aliphatic, cycloaliphatic, aromatic and/or heterocyclic and may optionally be unsaturated and/or substituted, for example by halogen atoms. Examples of polycarboxylic acids such as these include succinic acid, adipic acid, suberic acid, azelaic acid, sebacic acid, phthalic acid, isophthalic acid, trimellitic acid, phthalic acid anhydride, tetrahydrophthalic acid anhydride, hexahydrophthalic acid anhydride, tetrachlorophthalic acid anhydride, endomethylene tetrahydrophthalic acid anhydride, glutaric acid anhydride, maleic acid, maleic acid anhydride, fumaric acid, dimeric and trimeric fatty acids (such as oleic acid, optionally in admixture with monomeric fatty acids), terephthalic acid dimethyl ester and terephtalic acid-bis-glycol ester. Suitable polyhydric alcohols include ethylene glycol, 1,2- and 1,3-propylene glycol, 1,4- and 2,3-butylene glycol, 1,6-hexanediol, 1,8-octanediol, neopentyl glycol, cyclohexane dimethanol (1,4-bis-hydroxy-methylcyclohexane), 2-methyl-1,3-propanediol, glycerol, trimethylol propane, 1,2,6-hexanetriol, 1,2,4-butanetriol, trimethylol ethane, pentaerythritol, quinitol, mannitol and sorbitol, methylene glycoside, diethylene glycol, triethylene glycol, tetraethylene glycol, polyethylene glycol, dipropylene glycol, polypropylene glycols, dibutylene glycol and polybutylene glycols. The polyesters may also contain terminal carboxyl groups. Polyesters of lactones such as ε-caprolactone, or hydroxycarboxylic acids such as ω-hydroxycaproic acid may also be used.

The amino polyethers which may also be used as component (b1) are compounds having a molecular weight within above-mentioned range (the molecular weight is always the average molecular weight which may be calculated from the functionality and the content of isocyanate-reactive groups), wherein at least about 30 and preferably about 60 to 100 equivalent % of the isocyanate-reactive groups are primary and/or secondary (preferably primary) aromatically or aliphatically (preferably aromatically) bound amino groups and the remainder are primary and/or secondary aliphatically bound hydroxyl groups.

In these compounds, the terminal residues carrying the amino groups may also be attached to the polyether chain by urethane or ester groups. These "aminopolyethers" are prepared by methods known per se. For example, polyhydroxypolyethers such as polypropylene glycol ethers may be aminated by reaction with ammonia in the presence of Raney nickel and hydrogen (BE-PS No. 634,741). U.S. Pat. No. 3,654,370 describes the production of polyoxyalkylene polyamines by reaction of the corresponding polyol with ammonia and hydrogen in the presence of a nickel, copper, chromium catalyst DE-PS No. 1,193,671 describes the production of polyethers containing terminal amino groups by hydrogenation of cyanoethylated polyoxypropylene ethers. Other methods for the production of polyoxyalkylene (polyether) amines are described in U.S. Pat. Nos. 3,155,728, 3,236,895 and FR-PS No. 1,551,605. The production of polyethers containing terminal secondary amino groups is described, for example, in FR-PS No. 1,466,708.

Polyhydroxypolyethers of relatively high molecular weight may be converted into the corresponding anthranilic acid esters by reaction with isatoic acid anhydride, as described, for example, in DE-OS Nos. 2,019,432 and 2,619,840 and in U.S. Pat. Nos. 3,808,250, 3,975,428 and 4,016,143. Polyethers containing terminal aromatic amino groups are formed in this way.

According to DE-OS No. 2,546,536 and U.S. Pat. No. 3,865,791, relatively high molecular weight compounds containing terminal amino groups are obtained by reaction of NCO prepolymers based on polyhydroxypolyethers with enamines, aldimines or ketamines containing hydroxyl groups and subsequent hydrolysis.

It is preferred to use aminopolyethers obtained by hydrolysis of compounds containing terminal isocyanate groups, for example in accordance with DE-OS No. 2,948,419. In this process, polyethers preferably containing 2 or 3 hydroxyl groups are reacted with polyisocyanates to form NCO prepolymers and, in a second step, the isocyanate groups are converted by hydrolysis into an amino group.

The "aminopolyethers" used in accordance with the invention are often mixtures of the compounds mentioned by way of example and (on a statistical average) contain 2 to 3 terminal isocyanate-reactive groups. In the process according to the invention, the "aminopolyethers" may be used in admixture with polyhydroxypolyethers free from amino groups.

The chain extending agents or crosslinking agents (b2), which are generally used in a quantity of up to about 80% by weight, preferably in a quantity of up to about 65% by weight and more preferably in a quantity of about 10 to 60% by weight, based on the total weight of component (b), are preferably low molecular weight polyols or polyamines having a molecular weight in the above-mentioned range.

Suitable low molecular weight polyhydroxyl compounds (b2) include ethylene glycol, 1,2-dihydroxypropane, 1,3-dihydroxypropane, 1,2-dihydroxybutane, 1,4-dihydroxybutane, 1,6-dihydroxyhexane, 1,10-dihydroxydecane, diethylene glycol, triethylene glycol, dipropylene glycol, tripropylene glycol, glycerol, trimethylol propane or mixtures of these polyhydroxyl compounds.

The polyamines which may be used as component (b2) are preferably diamines containing only aromatically bound, primary or secondary (preferably primary) amino groups and having a molecular weight of 108 to 399 such as 1,4-diaminobenzene, 2,4-diaminotoluene, 2,4'- and/or 4,4'-diaminodiphenylmethane, 3,3'-dimethyl-4,4'-diamonodiphenylmethane or 4,4'-diamino-2,2-diphenylpropane or mixtures of these diamines.

However, the preferred diamines (b2) are aromatic diamines of the type containing at least one alkyl substituent in one ortho position to the amino groups, more preferably aromatic diamines containing at least one alkyl substituent in an ortho position to the first amino group and two alkyl substituents each containing from 1 to 4 carbon atoms in the ortho positions to the second amino groups, and most preferably aromatic diamines of the type which contain an ethyl, t-butyl, n-propyl and/or isopropyl substituent in at least one ortho position to the amino groups and, optionally, methyl substituents in other ortho positions to the amino groups.

Examples of preferred and particularly preferred diamines are 2,4-diaminomesitylene, 1,3,5-triethyl-2,4-diaminobenzene, 1,3,5-triisopropyl-2,4-diaminobenzene, 1-methyl-3,5-diethyl-2,6-diamonobenzene, 4,6-dimethyl-2-ethyl-1,3-diaminobenzene, 3,5,3',5'-tetraethyl-4,4'-diaminodiphenylmethane, 3,5,3',5'-tetraisopropyl-4,4'-diaminodiphenylmethane or 3,5-diethyl-3',5'-diisopropyl-4,4'-diaminodiphenylmethane. Particularly preferred diamines (b2) are 1-methyl-3,5-diethyl-2,4-diaminobenzene or technical mixtures thereof with up to 35% by weight, based on diamine mixture, of 1-methyl-3,5-diethyl-2,6-diaminobenzene.

The diamines mentioned by way of example may of course also be used in admixture with the polyhydroxyl compounds mentioned by way of example above as component (b2).

In addition to the synthesis components (b) other relatively high molecular weight compounds containing isocyanate-reactive groups may also be used as component (b1) or as part of component (b1) in the process to the invention. Other relatively high molecular weight compounds of the typle in question include polythioethers, polythio mixed ethers, polythioether esters, polythioether ester amides, polyacetals, hydroxyl-group-containing polycarbonates, polyester amides, polyamides, polyhydroxyl compounds containing urethane or urea groups and natural polyols such as castor oil, carbohydrates or starch.

Representatives of suitable synthesis components b) are also described in High Polymers, Vol. XVI "Polyurethanes, Chemistry and Technology," by Saunders-Frisch, Interscience Publishers, New York/London, Vol. I, 1962, pages 32–42 and 44–54 and Vol. II, 1964, pages 5–6 and 198–199 and in Kunststoff-Handbuch, Vol. VII, Vieweg-Höchtlen, Carl-Hanser-Verlag, Munich 1966, for example on pages 45 to 71.

Component (c) according to the invention is based on salts of (i) saturated or unsaturated aliphatic or cycloaliphatic carboxylic acids or carboxylic acid mixtures containing on average at least 8, preferably 12 to 36 and more preferably 12 to 24 carbon atoms and (ii) tertiary amines corresponding to the above general formula. Component (i) is preferably an aliphatic, optionally unsaturated monocarboxylic acid containing from 12 to 18 carbon atoms.

Suitable acids (i) are natural or synthetic monocarboxylic acids and natural fatty acid mixtures such as for example abietic acid, palmitic acid, stearic acid, oleic acid, elaidic acid, linoleic acid, ricinoleic acid, fatty acid esters of ricinoleic acid (particularly those of fatty acids containing more than 12 carbon atoms), polyricinoleic acid esters, linoleic acid: or technical fatty acid mixtures such as sperm oil fatty acid, train oil fatty acid, tallow fatty acid, soya oil fatty acid, palm kernel oil fatty acid, peanut oil fatty acid, tall oil fatty acid, ricinene acid, etc. It is preferred to use fatty acids or fatty acid mixtures which are liquid at room temperature, particularly oleic acid and/or technical fatty acid mixtures predominantly containing oleic acid such as soya oil fatty acid, tall oil fatty acid, ricinene acids and esters of 1 mol oleic acid with 1 to 3 mols ricinoleic acid.

The amine component (ii) of the release agents (c) according to the invention is a compound corresponding to the above general formula which does not contain any amide or ester groups in the molecule. The amines may be aromatic, araliphatic, cycloaliphatic or aliphatic. Tertiary amines of which the substituents are exclusively aliphatic are preferred. The atomic ratio of tertiary nitrogen to carbon is always less than 1:12.

Suitable tertiary amines (ii) include N,N-dialkylfatty amines such as N,N-dimethyldodecylamine, N,N-dimethyltetradecylamine, N,N-dimethylhexadecylamine, N,N-dimethyloctadecylamine, N,N-dimethylcocofattyamine, N,N-dimethylstearylamine, N-methyldistearylamine, N,N-dimethyl soya amine, N,N-dimethyl tallow fatty amine, N,N-dimethyl sperm oil fatty amine, and also the higher N,N-dialk-en-yl fatty amines containing identical or different $C_1$–$C_{18}$, preferably $C_1$–$C_4$ alkyl and/or $C_1$–$C_{18}$, preferably $C_1$–$C_4$ alkenyl groups as substituents of the basic nitrogen atoms; ethoxylation and/or propoxylation products of fatty amines such as the reaction products of oleylamine, cocofatty amine, stearylamine, tallow fatty amine, octadecylamine, tallow fatty oleylamine or other fatty amines with about 2 to 25 mols of ethylene oxide The release agents (c) may be prepared simply by mixing the individual components (i) and (ii), optionally at elevated temperatures of up to about 80° C.

At least 1 mol of the fatty acid component (i) should be used per mol tertiary amine (ii); stoichiometric quantities of fatty acid or excess quantities of up to 200 mol %, based on the tertiary amino groups, are preferably used.

Auxiliaries and additives (d) which may optionally be used in accordance the invention include (d1) water and/or readily volatile organic compounds as blowing agents. Suitable organic blowing agents include acetone, halogen-substituted alkanes (such as methylene chloride, chloroform, monofluorotrichloromethane, chlorodifluoromethane or dichlorodifluoromethane), butane, hexane, heptane or dimethyl ether. Compounds which eliminate nitrogen or carbon dioxide at elevated temperature are also suitable for use as blowing agents.

Other auxiliaries and additives (d) which may optionally be used in accordance with invention include (d2) catalysts, for example, tertiary amines such as , N,N-dimethylbenzylamine, triethylenediamine, permethylated diethylenetriamine or 1,2-dimethylimidazole; tertiary amines which may be chemically incorporated such as triethanolamine, triisopropanolamine, N-methyldiethanolamine; catalysts containing carbon-silicon bonds such as the compounds described in DE-PS No. 1,229,290: nitrogen-containing bases such as tretraalkylammonium hydroxides; alkali hydroxides or phenolates such as sodium hydroxide, potassium hydroxide, sodium phenolate or potassium phenolate: alkali alcoholates, such as sodium methylate; organometallic compounds, especially organotin compounds, for example tin(II) salts of carboxylic acids such as tin(II) acetate, tin (II) octoate, tin(II) ethylhexoate and tin(II) laurate; and the dialkyltin salts of carboxylic acids such as dibutyltin diacetate, dibutyltin dilaurate, dibutyltin maleate or dioctyltin diacetate.

Other representatives of catalysts which may be used in accordance with the invention and information on the way in which the catalysts work can be found in Kunststoff-Handbuch, Vol. VII, edited by Vieweg and Hochtlen, Carl-Hanser-Verlag, Munich 1966, for example on pages 96 to 102.

The catalysts are generally used in a quantity of about 0.001 to 10% by weight, based on the quantity of compounds containing at least two isocyanate-reactive hydrogen atoms and having a molecular weight of 62 to about 10,000.

Other auxiliaries and additives (d) which may optionally be used in accordance with the invention include (d3) surface-active additives (emulsifiers and foam stabilizers). Suitable emulsifiers include the sodium salts of castor oil sulfonates or of fatty acids, or salts of fatty acids with amines such as diethylamine oleate or diethanolamine stearate. Alkali or ammonium salts of sulfonic acids (such as dodecyl-benzene sulfonic acid or dinaphthylmethane disulfonic acid), fatty acids (such as ricinoleic acid) or polymeric fatty acids may also be co-used as surface-active additives.

Other auxiliaries and additives (d) which may optionally be used in accordance with the invention include (d4) foam stabilizers, above all water-soluble polyether siloxanes. The structure of these compounds is generally such that a copolymer of ethylene oxide and propylene oxide is attached to a polydimethyl siloxane residue. Foam stabilizers of this type are described, for example, in U.S. Pat. No. 2,764,565.

Other auxiliaries and additives (d) which may optionally be used in accordance with the invention include in particular the internal mold release agents known per se from the prior art, for example those described in DE-OS No. 1,953,637, in DE-OS No. 2,121,670, in DE-OS No. 2,431,968 or in BE-PS No. 782,942, especially the oleic acid or tall oil fatty acid salt of the amine containing amide groups obtainable by reaction of N,N-dimethylaminopropyl-amine with oleic acid or tall oil fatty acid. Release agents which may be incorporated in the structure of plastics material of the type described for example in DE-OS No. 2,305,276 and in DE-OS No. 2,356,692, may be additionally used.

Finally, auxiliaries and additives (d) which may optionally be used in accordance with the invention include reaction retarders, for example acid-reacting compounds, such as hydrochloric acid or organic acid halides; cell regulators known per se such as paraffins, fatty alcohols or dimethyl polysiloxanes; pigments or dyes: flameproofing agents known per se such as trischloroethyl phosphate or ammonium phosphate and polyphosphate; stabilizers against the effects of aging and weather; plasticizers; fungistatic and bacteriostatic agents; and fillers such as barium sulfate, kieselguhr, carbon black or whiting.

Further examples of surface-active additives and foam stabilizers, cell regulators, reaction retarders, stabilizers, flameproofing agents, plasticizers, dyes, fillers, fungistatic and bacteriostatic agents which may optionally be used in accordance with the invention, information on the use of such additives and the way in which they work can be found in Kunstsoff-Handbuch, Vol. VII, edited by Vieweg and Hotchlen, Carl-Hanser-Verlag, Munich 1966, for example on pages 103 to 113.

In the practical application of the process according to the invention, the polyisocyanate component (a) is used in quantities which correspond to an NCO index of about 70 to 160 and preferably about 90 to 110. The NCO index is the quotient of the number of NCO groups divided by the number of isocyanate-reactive groups multiplied by 100; primary amino groups are counted as monofunctional groups. The process according to the invention is particularly suitable for the production of polyurethane plastics optionally containing urea groups or—where reaction components (b) containing amino groups are exclusively used—for the production of plastics based on polyureas. However, it is also possible, although less preferred, to produce isocyanurate plastics of the type mentioned by the process according to the invention. In this case, the reactants are used at NCO indices of up to about 1500, preferably about 160 to 1500 and more preferably about 800 to 1200. The co-use of a trimerization catalyst (for example potassium acetate or a Mannich base active as a trimerization catalyst) ensures simultaneously that a trimerization reaction of the excess isocyanate groups takes place at the same time as the isocyanate polyaddition reaction.

In the process according to the invention, the release agents (c) according to the invention are used in a quantity of about 0.1 to 20% by weight, preferably in a quantity of about 0.3 to 9% by weight, based on the reaction mixture as a whole.

The reaction is carried out in closed molds. Both metal molds (steel or aluminum) and plastic molds (for example based on epoxy resins) may be used. The reaction mixture of the individual components (a) to (d) is prepared in known manner by mixing the individual components shortly before the mold is filled: components (c) and (d) are generally added to component (b) beforehand. The process according to the invention is suitable both for the production of compact moldings and for the production of foamed moldings, i.e. the density of the resulting unfilled moldings is generally within a range of about 300 to 1200 g/cm$^3$. In the production of foams, in-mold foaming is carried out in such a way that the molding has a compact skin and a cellular core. According to the invention, it is possible in this case to introduce a foamable reaction mixture into the mold in such a quantity that the foam formed just fills the mold. However, it is also possible to introduce more foamable reaction mixture into the mold than is necessary for filling the interior of the mold with foam. This particular technique is known as overcharging and is known, for example, from U.S. Pat. No. 3,178,490 and from U.S. Pat. No. 3,182,104. According to the invention, it is also possible to produce cold-hardening foams (cf. GB-PS No. 1,162,517, DE-OS No. 2,153,086).

The reaction components (a) to (d) may be processed by the one-shot process, by prepolymer process or by the semiprepolymer process, often using machines, for example of the type described in U.S. Pat. No. 2,764,565. The reaction components are preferably processed by reaction injection molding. In this process, the polyisocyanate component a) is preferably mixed with a mixture of components (b), (c) and (d) and the resulting mixture is introduced into the mold.

The products obtained by the process according to the invention may be used in rigid form for the production of furniture components, bodywork components of motor vehicles, technical equipment and constructional units and, in their semirigid to flexible form, for the production of safety padding in automobiles, elastic shoe soles, shock absorbers, etc.

The process according to the invention is illustrated by the following Examples in which all the parts quoted are parts by weight, unless otherwise indicated.

EXAMPLES

Preparation of the release agents:

To prepare the release agents, mixtures of 1 equivalent of the amine compound and 1 equivalent of the fatty acids were stirred for approximately 30 minutes at 60° C. The two components may be mixed in any order. In general, there was no need to add solvents in the preparation of the salts which, in most cases, accumulated as liquids or low-melting solids.

When amine or acid mixtures of indefinite composition were used, the equivalent weight of these mixtures was determined by an acid-based titration before the reaction. Errors of ±5% attributable to the hydrophobicity of the starting substances had no significant effect upon the properties of the end products.

Salts of the following composition were used as release agents:

| Substance No. | Amine | Equivalent Weight | Acid | Equivalent Weight |
|---|---|---|---|---|
| 1 | Genamin 10 R 302 D[7] | 185 | Oleic Acid[1] | 282.5 |
| 2 | Genamin 12 R 302 D[8] | 215 | " | 282.5 |
| 3 | Genamin 14 R 302 D[9] | 248.5 | " | 282.5 |
| 4 | Genamin 16 R 302 D[10] | 279.2 | " | 282.5 |
| 5 | Genamin 18 R 302 D[11] | 290.4 | " | 282.5 |
| 6 | Genamin 20/22 R 320 D[12] | 337.5 | " | 282.5 |
| 7 | Genamin 10 R 302 D | 185 | Nouracid LD 65[2] | 282 |
| 8 | Genamin 12 R 302 D | 215 | " | 282 |
| 9 | Genamin 14 R 302 D | 248.5 | " | 282 |
| 10 | Genamin 16 R 302 D | 279.2 | " | 282 |
| 11 | Genamin 18 R 302 D | 290.4 | " | 282 |
| 12 | Genamin 20/22 R 302 D | 337.5 | " | 282 |
| 13 | Genamin 12 R 302 D | 215 | Nouracid LE 80[3] | 280.5 |
| 14 | Genamin 12 R 302 D | 215 | Nouracid DE 656[4] | 287 |
| 15 | Genamin 12 R 302 D | 215 | Nouracid DE 402[5] | 284 |
| 16 | Genamin 12 R 302 D | 215 | Nouracid DZ 453[6] | 285.5 |

[1]Oleic acid Edenor Ti 05, a product of Unichema
[2]A linseed oil fatty acid produced by Akzo Chemie GmbH, Emmerich containing 14% total fatty acids $C_{12}$-$C_{18}$ 21% oleic acid 25% linoleic acid 40% linolenic acid
[3]A linseed oil fatty acid produced by Akzo Chemie GmbH, Emmerich containing 13% total fatty acids $C_{12}$-$C_{18}$ 20% oleic acid 17% linoleic acid 50% linolenic acid
[4]a ricinene fatty acid produced by Akzo Chemie GmbH, Emmerich containing 3% total fatty acids $C_{12}$-$C_{18}$ 6% oleic acid 26% linoleic acid 65% linolenic acid
[5]A ricinene fatty acid produced by Akzo Chemie GmbH, Emmerich containing 10% total fatty acids $C_{12}$-$C_{18}$ 17% oleic acid 48% linoleic acid 25% conj. $C_{18}$ diene acids
[6]A ricinene fatty acid produced by Akzo Chemie GmbH, Emmerich containing 6% total fatty acids $C_{12}$-$C_{18}$ 21% oleic acid 35% linoleic acid 34% conj. $C_{18}$ diene acids 3% linolenic acid 1% sat. fatty acids >$C_{18}$
[7]A tertiary amine produced by Hoechst, Frankfurt, containing ≧95% dimethyldodecylamine
[8]A tertiary amine produced by Hoechst, Frankfurt, containing ≧95% dimethyltetradecylamine
[9]A tertiary amine produced by Hoechst, Frankfurt, containing ≧90% dimethylhexadecylamine
[10]A tertiary amine produced by Hoechst, Frankfurt, containing ≧95% dimethyloctadecylamine
[11]A tertiary amine produced by Hoechst, Frankfurt, containing 10% dimethyloctadecylamine 15% dimethyleicosylamine 75% dimethyldocosylamine
[12]A tertiary amine produced by Hoechst, Frankfurt, adduct of an amine mixture of 1% dodecylamine 4% tetradecylamine 12% hexadecylamine 83% octadecylamine and approx. 8 mols ethylene oxide per mol amine mixture. 100 parts by weight of a polyol mixture, OH No. 415, based on 70.9 pbw of a polyether, OH No. 27, obtained by the addition of a mixture of 80% propylene oxide and 20% ethylene oxide onto trimethylol propane, 1.7 pbw of a propoxylated ethylene diamine, OH No. 790, 21.1 pbw ethylene glycol, 1.7 pbw polyether polysiloxane stabilizer (OS 50, a product of Bayer AG, Leverkusen) 0.08 pbw dibutyltin(IV) laurate 0.34 pbw 30% solution of 1,4-diazabicyclo-(2,2,2)-octane in dipropylene glycol 4.2 pbw internal release agent according to the examples. 100 pbw of this polyol mixture were reacted with 111 pbw of a urethane-modified polyisocyanate mixture having an average NCO functionality of 2.2 and an NCO content of 28.5% by weight and prepared by the reaction of polypropylene glycol having an average molecular weight of 218 with a polyisocyanate mixture of 75 parts by weight 4,4'-diisocyanatodiphenylmethane. 4 parts by weight 2,4'-diisocyanatodiphenylmethane and 21 parts by weight higher polyisocyanates of the diphenylmethane series.

The polyol mixture was mixed with the polyisocyanate using a laboratory stirrer and poured onto a black plate measuring 310×210×0.5 mm in an open mold kept at 60° C. The black plates had been degreased and freed from rust with fine steel wool and methylene chloride. The PUR mixture set after about 20 to 30 s. After 5 minutes, the black plate covered by the PUR mass was removed from the mold. The PUR material could not be removed from the black plate without the use of an internal release agent because it adhered very firmly to the surface thereof.

When internal release agents (see Table 1) were used in the concentration indicated, the hard molding was removed from the black plate without adhering thereto.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the production of a molding having a compact surface by reacting in a closed mold a reaction mixture comprising
   (a) an organic polyisocyanate,
   (b) a compound containing isocyanate-reactive groups and having a molecular weight of 62 to about 10,000 and
   (c) a mold release agent comprising a salt of
      (i) a compound containing (on a statistical average) at least 8 carbon atoms per molecule and comprising a member selected from the group consisting of saturated aliphatic carboxylic acids, unsaturated aliphatic carboxylic acids, saturated cycloaliphatic carboxylic acids, unsaturated cycloaliphatic carboxylic acids and mixtures thereof and
      (ii) at least one tertiary amine corresponding to the formula

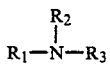

wherein
$R_1$ comprises a member selected from the group consisting of saturated, aliphatic hydrocarbon radicals containing at least 12 carbon atoms and unsaturated, aliphatic hydrocarbon radicals containing at least 12 carbon atoms and $R_2$ comprises a member selected from the group consisting of saturated, aliphatic hydrocarbon radicals containing from 1 to 18 carbon atoms, unsaturated, aliphatic hydrocarbon radicals containing from 1 to 18 carbon atoms, $C_2$–$C_{40}$ hydroxyalkyl radicals, $C_2$–$C_{40}$ hydroxyalkyl radicals containing ether bridges and mixtures thereof and $R_3$ comprises a member selected from the group consisting of saturated, aliphatic hydrocarbon radicals containing from 1 to 18 carbon atoms, unsaturated, aliphatic hydrocarbon radicals containing from 1 to 18 carbon atoms; $C_2$–$C_{40}$ hydroxyalkyl radicals, $C_2$–$C_{40}$ hydroxyalkyl radicals containing ether bridges and mixtures thereof.

2. The process of claim 1 wherein component (c)(i) comprises a member selected from the group consisting of saturated, aliphatic $C_{12}$–$C_{18}$ monocarboxylic acids, unsaturated, aliphatic $C_{12}$–$C_{18}$ monocarboxylic acids and mixtures thereof.

3. The process of claim 1 wherein component (c)(i) comprises a member selected from the group consisting of oleic acid and fatty acid mixtures containing oleic acid.

4. The process of claim 1 wherein component (c) present in a quantity of about 0.1 to 20% by weight, based on the total weight of the reaction mixture.

5. The process of claim 2 wherein component (c) present in a quantity of about 0.1 to 20% by weight, based on the total weight of the reaction mixture.

6. The process of claim 3 wherein component (c) present in a quantity of about 0.1 to 20% by weight, based on the total weight of the reaction mixture.

* * * * *